United States Patent
Newman et al.

(10) Patent No.: US 10,144,307 B2
(45) Date of Patent: Dec. 4, 2018

(54) SYSTEMS AND METHODS FOR REPLACING A VEHICLE BATTERY

(71) Applicant: NIO NEXTEV LIMITED, Central OT (HK)

(72) Inventors: Austin Newman, San Jose, CA (US); Yadunandana Yellambalase, Mountain View, CA (US)

(73) Assignee: NIO NEXTEV LIMITED, Hong Kong (CN)

( * ) Notice: Subject to any disclaimer, the term of this patent is extended or adjusted under 35 U.S.C. 154(b) by 28 days.

(21) Appl. No.: 15/246,856

(22) Filed: Aug. 25, 2016

(65) Prior Publication Data
US 2017/0225662 A1    Aug. 10, 2017

Related U.S. Application Data

(60) Provisional application No. 62/293,220, filed on Feb. 9, 2016, provisional application No. 62/300,467, filed on Feb. 26, 2016.

(51) Int. Cl.
*H02J 7/00*    (2006.01)
*B60L 11/18*    (2006.01)
(Continued)

(52) U.S. Cl.
CPC ............ *B60L 11/1879* (2013.01); *B60K 1/04* (2013.01); *B60L 11/1822* (2013.01); *B60L 11/1846* (2013.01); *B60L 11/1877* (2013.01); *B60S 5/06* (2013.01); *H01M 2/1077* (2013.01); *H01M 2/1083* (2013.01); *H01M 2/206* (2013.01); *H01M 10/613* (2015.04); *H01M 10/625* (2015.04); *H02J 7/0027* (2013.01);
(Continued)

(58) Field of Classification Search
CPC ....... Y02E 60/12; H02J 7/0004; H02J 7/0006; H01M 10/48; H01M 10/4257
USPC ........................................................ 320/106
See application file for complete search history.

(56) References Cited

U.S. PATENT DOCUMENTS

| | | |
|---|---|---|
| 4,317,497 A | 3/1982 | Alt et al. |
| 5,501,289 A | 3/1996 | Nishikawa et al. |

(Continued)

FOREIGN PATENT DOCUMENTS

DE    202015005208    8/2015

OTHER PUBLICATIONS

Final Action for U.S. Appl. No. 15/224,659, dated Sep. 11, 2017, 12 pages.
(Continued)

*Primary Examiner* — Arun Williams
(74) *Attorney, Agent, or Firm* — Sheridan Ross P.C.

(57) ABSTRACT

A management system of a vehicle battery replacement system has a plurality of battery replacement stations for replacing a depleted battery pack of an electric vehicle with a charged battery pack. Each battery replacement station includes a coordinating device. The management system also has a control system in communication with the coordinating devices of the battery replacement stations and a plurality of client devices. The control system is configured to receive a request for a battery replacement operation from a client device, and select a battery replacement station of the plurality of battery replacement stations for performing the battery replacement operation.

20 Claims, 4 Drawing Sheets

(51) Int. Cl.
  *H01M 2/10* (2006.01)
  *H01M 2/20* (2006.01)
  *H01M 10/613* (2014.01)
  *H01M 10/625* (2014.01)
  *B60S 5/06* (2006.01)
  *B60K 1/04* (2006.01)
  *H01M 10/6568* (2014.01)

(52) U.S. Cl.
  CPC .......... *H02J 7/0045* (2013.01); *H05K 999/99* (2013.01); *B60K 2001/0438* (2013.01); *B60K 2001/0472* (2013.01); *B60L 2230/16* (2013.01); *B60L 2230/40* (2013.01); *B60Y 2200/90* (2013.01); *B60Y 2306/01* (2013.01); *H01M 10/6568* (2015.04); *H01M 2200/00* (2013.01); *H01M 2220/20* (2013.01); *Y02T 10/7005* (2013.01); *Y02T 10/705* (2013.01); *Y02T 10/7055* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 7,201,384 B2 | 4/2007 | Chaney |
| 1,750,749 A1 | 3/2009 | Zhou et al. |
| 7,913,788 B1 | 3/2011 | Bryer et al. |
| 8,051,934 B2 | 11/2011 | Kiya et al. |
| 8,091,669 B2 | 1/2012 | Taneda et al. |
| 8,210,301 B2 | 7/2012 | Hashimoto et al. |
| 8,322,476 B2 | 12/2012 | Komaki |
| 8,409,749 B2 | 4/2013 | Nishino et al. |
| 8,839,895 B2 | 9/2014 | Kato et al. |
| 9,045,030 B2 | 6/2015 | Rawlinson et al. |
| 9,321,338 B2 | 4/2016 | Naruke |
| 9,490,460 B2 | 11/2016 | Yanagi |
| 9,630,483 B2 | 4/2017 | Yamada et al. |
| 1,000,305 A1 | 6/2018 | Paramasivam et al. |
| 1,000,310 A1 | 6/2018 | Cho et al. |
| 1,000,870 A1 | 6/2018 | Wu et al. |
| 1,002,047 A1 | 7/2018 | Ito et al. |
| 2003/0209375 A1* | 11/2003 | Suzuki .................... B60K 1/04 180/65.22 |
| 2006/0024566 A1 | 2/2006 | Plummer |
| 2008/0294283 A1* | 11/2008 | Ligrano .................... B60S 5/06 700/218 |
| 2009/0058355 A1* | 3/2009 | Meyer ................. B60L 11/1822 320/104 |
| 2009/0078481 A1* | 3/2009 | Harris ...................... B60K 1/04 180/65.1 |
| 2009/0082957 A1* | 3/2009 | Agassi ..................... B60L 3/12 701/532 |
| 2010/0009244 A1 | 1/2010 | Murata |
| 2010/0285344 A1 | 11/2010 | Plummer |
| 2011/0198138 A1 | 8/2011 | Sadrmajles et al. |
| 2012/0009804 A1 | 1/2012 | Heichal et al. |
| 2012/0312612 A1 | 12/2012 | Harrison et al. |
| 2013/0175829 A1 | 7/2013 | Kim et al. |
| 2013/0270864 A1 | 10/2013 | Young et al. |
| 2014/0284125 A1 | 9/2014 | Katayama et al. |
| 2014/0315064 A1 | 10/2014 | Katayama et al. |
| 2014/0329125 A1 | 11/2014 | Miyanaga et al. |
| 2014/0338998 A1 | 11/2014 | Fujii et al. |
| 2014/0338999 A1 | 11/2014 | Fujii et al. |
| 2015/0255764 A1 | 9/2015 | Loo et al. |
| 2016/0068195 A1 | 3/2016 | Hentrich et al. |
| 2016/0137229 A1 | 5/2016 | Nishida |
| 2017/0225558 A1 | 2/2017 | Newman et al. |

OTHER PUBLICATIONS

Official Action for U.S. Appl. No. 15/429,095, dated Oct. 26, 2017, 12 pages.
Official Action for U.S. Appl. No. 15/224,661, dated Sep. 19, 2017, 13 pages.
International Search Report and Written Opinion for International Patent Application No. PCT/US17/17137, dated Jun. 6, 2017, 13 pages.
Notice of Allowance for U.S. Appl. No. 15/224,660, dated Apr. 26, 2017, 8 pages.
Official Action for U.S. Appl. No. 15/224,661, dated Jun. 6, 2017, 8 pages, Restriction Requirement.
U.S. Appl. No. 15/224,659, filed Jul. 31, 2016, Newman.
U.S. Appl. No. 15/224,660, filed Jul. 31, 2016, Newman.
U.S. Appl. No. 15/224,661, filed Jul. 31, 2016, Newman.
Office Action for U.S. Appl. No. 15/224,659, dated Mar. 21, 2017, 11 pages.
Official Action for U.S. Appl. No. 15/224,660, dated Jan. 26, 2017, 6 pages, Restriction Requirement.
Notice of Allowance for U.S. Appl. No. 15/224,661, dated Aug. 14, 2018, 11 pages.

\* cited by examiner

SYSTEMS AND METHODS FOR REPLACING A VEHICLE BATTERY

PRIORITY CLAIM

This application claims priority under 35 U.S.C. § 119 to U.S. Provisional Application No. 62/293,220, filed on Feb. 9, 2016, and U.S. Provisional Application No. 62/300,467, filed on Feb. 26, 2016, both of which are expressly incorporated by reference herein in their entirety.

FIELD OF INVENTION

The present invention relates to systems and methods for replacing a vehicle battery, and, more particularly, to an infrastructure for supporting vehicles which run on replaceable batteries.

BACKGROUND

Electric vehicles have proven to be a viable alternative to gasoline-powered cars. The increasing demand for electric vehicles has placed importance on the development of the associated technology and the planning of an infrastructure that will support the many electric vehicles that will be on the roads in the future.

Most of the electric vehicles currently on the market were designed and manufactured according to a recharging-model, in which a vehicle uses the same, periodically-recharged battery pack over a long period of time. This model suffers from some drawbacks, however, because it requires car owners to allot an amount of time for recharging in which the car cannot be used. Further, planning must be made to ensure that the vehicle is near a charging station when the battery needs to be recharged. This limits the use of the vehicle to certain routes, ranges, and locations.

Vehicles designed and manufactured according to a battery replacement-model, on the other hand, allow a drained battery to be replaced with a charged battery, instead of recharged. These vehicles may overcome many of the problems associated with the recharging-model if an associated battery replacement process is otherwise faster than and more readily-available than the alternative recharging process. Moreover, a replacement-battery infrastructure may be more feasible and applicable for at least some implementation areas than it's recharging-model counterpart. In order to achieve these goals a viable design would include features that address issues such as standardization, safety, ease-of-use, and logistics. However, current battery replacement-model electric vehicles have yet to find solutions for many of the problems that arise in these areas.

The present disclosure is directed to overcoming one or more problems of the prior art.

SUMMARY

In one aspect, the present disclosure is directed to a management system of a vehicle battery replacement system. The management system includes a plurality of battery replacement stations for replacing a depleted battery pack of an electric vehicle with a charged battery pack. Each battery replacement station includes a coordinating device. The management system further includes a control system in communication with the coordinating devices of the battery replacement stations and a plurality of client devices. The control system is configured to receive a request for a battery replacement operation from a client device, and select a battery replacement station of the plurality of battery replacement stations for performing the battery replacement operation.

In another aspect, the present disclosure is directed to a battery replacement station. The battery replacement station includes a battery pack queue including charged batteries stored at less than full charge, a charging device; and a coordinating device. The coordinating device is configured to receive a request to perform a battery replacement operation, select a charged battery to be used in the battery replacement operation; and charge the selected battery to full charge using the charging device.

In yet another aspect, the present disclosure is directed to a method for replacing a battery pack of an electric vehicle. The method includes receiving a request for a battery replacement operation from a client device, the request including a status information. The method also includes coordinating, by a processor, the battery replacement operation by selecting a battery replacement station for performing the battery replacement operation based on the status information. The status information may be one or more of a location of the vehicle, a remaining battery charge, historical replacement information, battery availability information, or future travel information.

BRIEF DESCRIPTION OF THE DRAWINGS

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Disclosed embodiments provide a management system which supports vehicles having replaceable batteries, and a customer system which allows a user to coordinate a battery replacement operation with the management system. A battery replacement infrastructure is provided having a variety of different battery replacement stations which provide different options for a user to replace their vehicle's battery. The customer system may include a client device, such as a user's smart phone or computer, or the vehicle itself, which provides a path to communicate with the management system and to coordinate a battery replacement operation at a battery replacement station. In some embodiments, the battery replacement stations are adapted to the environment in which the station is located. For example, individual on-demand service operations may be available in highly-populated areas (e.g., cities), while large battery-swap stations may be located in areas where more space is available.

In addition, the management and customer systems include features which enable effective implementation of the battery replacement system. Examples of these features include location-based assignment of a replacement service, a battery subscription service, and efficient battery handling procedures. The disclosed embodiments provide a system which renders battery replacement-model electric vehicles a practical and viable alternative to gasoline-powered and recharging-model electric vehicles.

Figure 1:
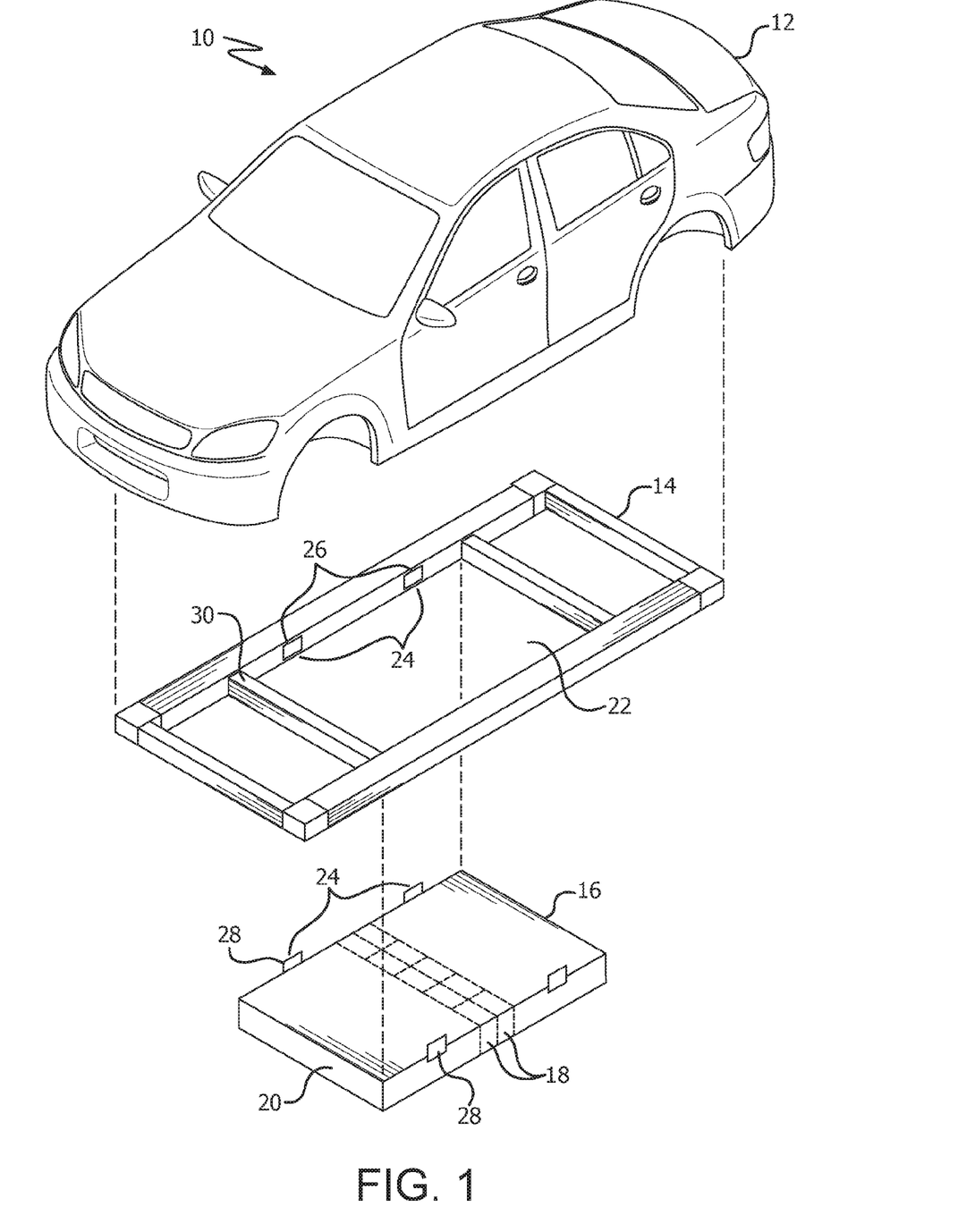
FIG. 1 is an exploded view of an exemplary vehicle.

FIG. 1 is an exploded view illustrating an exemplary vehicle 10. Vehicle 10 includes at least a body 12, a chassis 14, and a battery system 16. The body 12 includes the features and components that form the passenger compartment and exterior shell of the vehicle 10. The body 12 is supported on and by the chassis 14. The chassis 14 is a skeleton frame structure which includes, for example, a plurality of interconnected frame components, such as rigid bars, plates, fasteners, etc. The chassis 14 forms a base for supporting the body 12 and which is supported off of the ground by the wheels of the vehicle 10. The chassis 14 essentially forms a bottom portion of the vehicle 10. The battery assembly 16 is integrated into the body 12 and chassis 14 and provides electrical energy to a power system of the vehicle 10 through a plurality of electrical storage devices 18 provided in one or more battery packs 20.

Consistent with disclosed embodiments, vehicle 10 is an electric vehicle. This means that the electrical storage devices 18 provide electrical energy to a motor (not shown) for generating mechanical power to move the vehicle 10. For example, in some embodiments, vehicle 10 is an all-electric vehicle in which all or substantially all of the power generated to move vehicle 10 is provided by the electrical storage devices 18. In these embodiments, the vehicle 10 includes an engine only as a backup power source or does not include an engine. In other embodiments, vehicle 10 is a hybrid vehicle in which some of the power generated by the power system 16 is provided by the electrical storage devices 18 and a remainder of the power is provided by an engine, such as an internal combustion engine.

It should be understood that the battery assembly 16 includes additional components which allow the electrical storage devices 18 to be utilized to provide electrical energy to a motor to power the vehicle 10. For example, the battery assembly 16 may include electrical connections (e.g., wiring, bus bars, etc.), cooling features (e.g., cooling panels), control system components (e.g., controllers, sensors, actuators, etc.), and the like, in order to allow the vehicle 10 to operate via electrical energy.

As shown in FIG. 1, the battery pack 20 is generally sized and shaped to fit in a bay 22 of the chassis 14. The battery pack 20 is movable into and out of the bay 22 in order to facilitate attachment and removal of the battery pack 20 to and from the vehicle 10. An attachment mechanism 24 releasably attaches the battery pack 20 to the chassis 14. In an exemplary embodiment, the attachment mechanism 24 includes a plurality of first attachment parts 26 on the chassis 14 and a plurality of second attachment parts 28 on each battery pack 20. The first attachment parts 26 are connectable to the second attachment parts 28 in order to secure each battery pack 20 in the bay 22.

FIG. 1 illustrates a chassis 14 which includes one large bay 22 for receiving the battery pack 20. In this embodiment, the battery pack 20 may include a rigid internal frame structure which protects the battery pack 20 from damage during a collision. In other embodiments, a plurality of rigid cross rails may separate the bay 22 into a plurality of bays for receiving a different part of the battery pack 20. The plurality of cross rails provide structural integrity to the frame structure in order to protect the battery pack 20 from damage during a collision.

Figure 2:
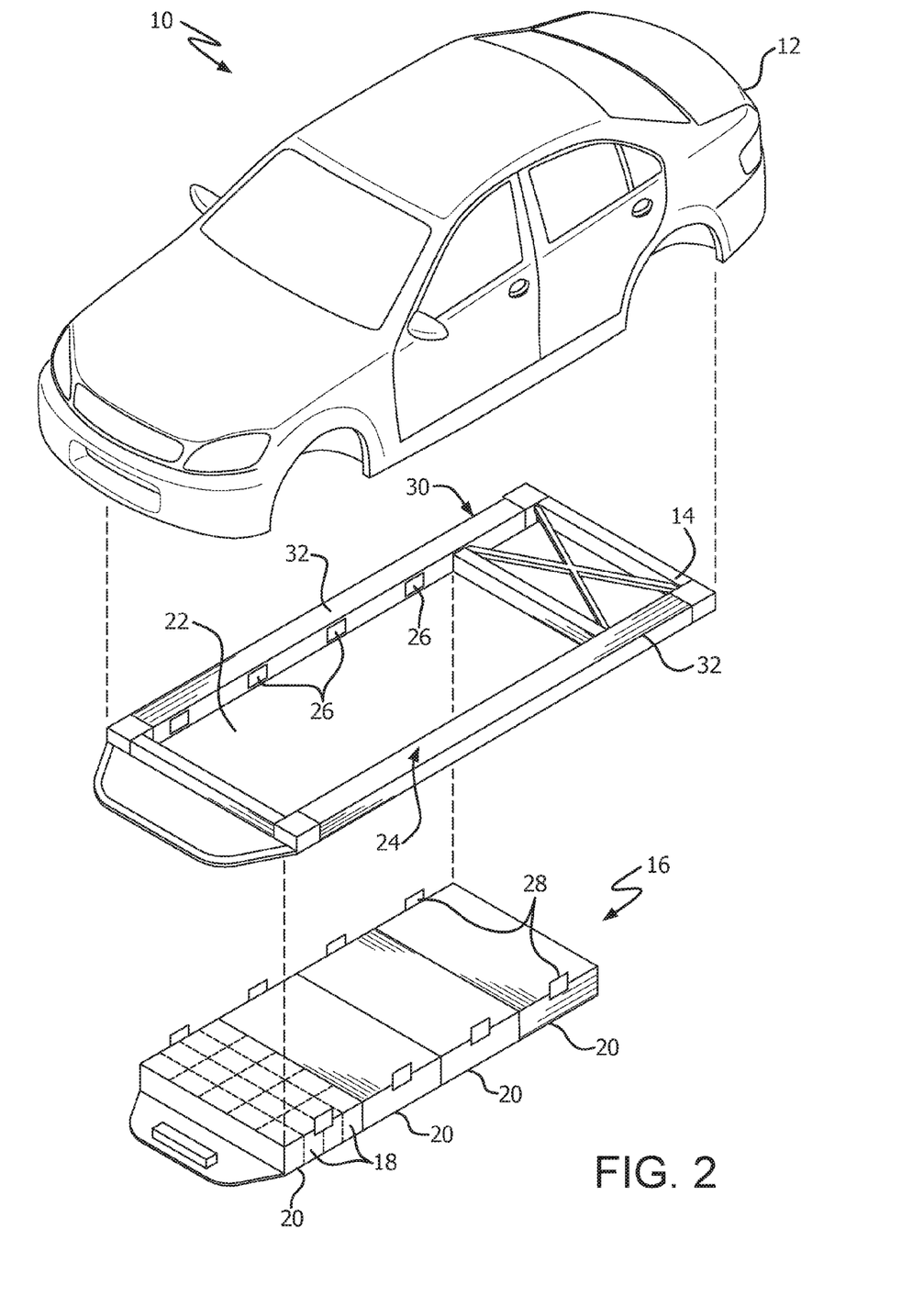
FIG. 2 is an exploded view of an exemplary vehicle according to another embodiment.

FIG. 2 illustrates an alternative embodiment in which battery assembly 16 includes a plurality of interconnected battery packs 20. The battery packs 20 may each be attached to the chassis 14 through a plurality of attachment mechanisms 24. The battery packs 20 may also be electrically connected to each other through electrical connections such that each battery pack 20 may store electrical energy in corresponding electrical storage devices 18 which may be used by a motor to move the vehicle 10.

In an exemplary embodiment, the battery packs 20 are connected in parallel. For example, positive terminals of each battery pack 20 may be connected to a positive terminal of an adjacent battery pack 20 and negative terminals of each battery pack 20 may be connected to a negative terminal of an adjacent battery pack 20. By virtue of being connected in parallel, the capacity rating of the sum of the two battery packs 20 is double that of just one of the battery packs 20. On the other hand, the voltage of the combined pair is the same as a single battery pack 20. In this way, the addition of battery packs 20 to a battery assembly 16 of a vehicle 10 adds additional capacity rating (additional amp hours), which provides additional range (time-in-use) to the vehicle 10. The range of the vehicle 10 is thus customizable based on the number of battery packs 20 attached thereto.

Moreover, as this type of connection does not increase voltage, the power and speed dynamics of the vehicle will remain relatively unchanged regardless of the number of battery packs 20 added to the vehicle 10. Each battery pack 20 is preferably configured to produce sufficient voltage to adequately power an associated motor of the vehicle 10 (e.g., to allow the vehicle 10 to reach highways speeds, travel uphill, etc.).

As described herein, the vehicle 10 may include one or more battery packs 20 which provide electrical energy to be converted to mechanical power for moving the vehicle 10. A user (or automated system) may thus operate vehicle 10 to travel to selected destinations. As the vehicle operates, the electrical storage devices 18 in the battery packs 20 will discharge. Eventually, the electrical storage devices 18 will be depleted to the point that the vehicle 10 may no longer operate reliably. In order to bring the vehicle 10 back to an operable condition, one or more of the battery packs 20 on the vehicle must be replaced by a charged battery pack 20.

For the purposes of this description, a depleted battery pack is a battery pack 20 in which the electrical storage devices 18 in the battery pack are discharged below a threshold amount and a charged battery pack is a battery pack 20 in which the electrical storage devices 18 in the battery pack are charged above the threshold amount.

Figure 3:
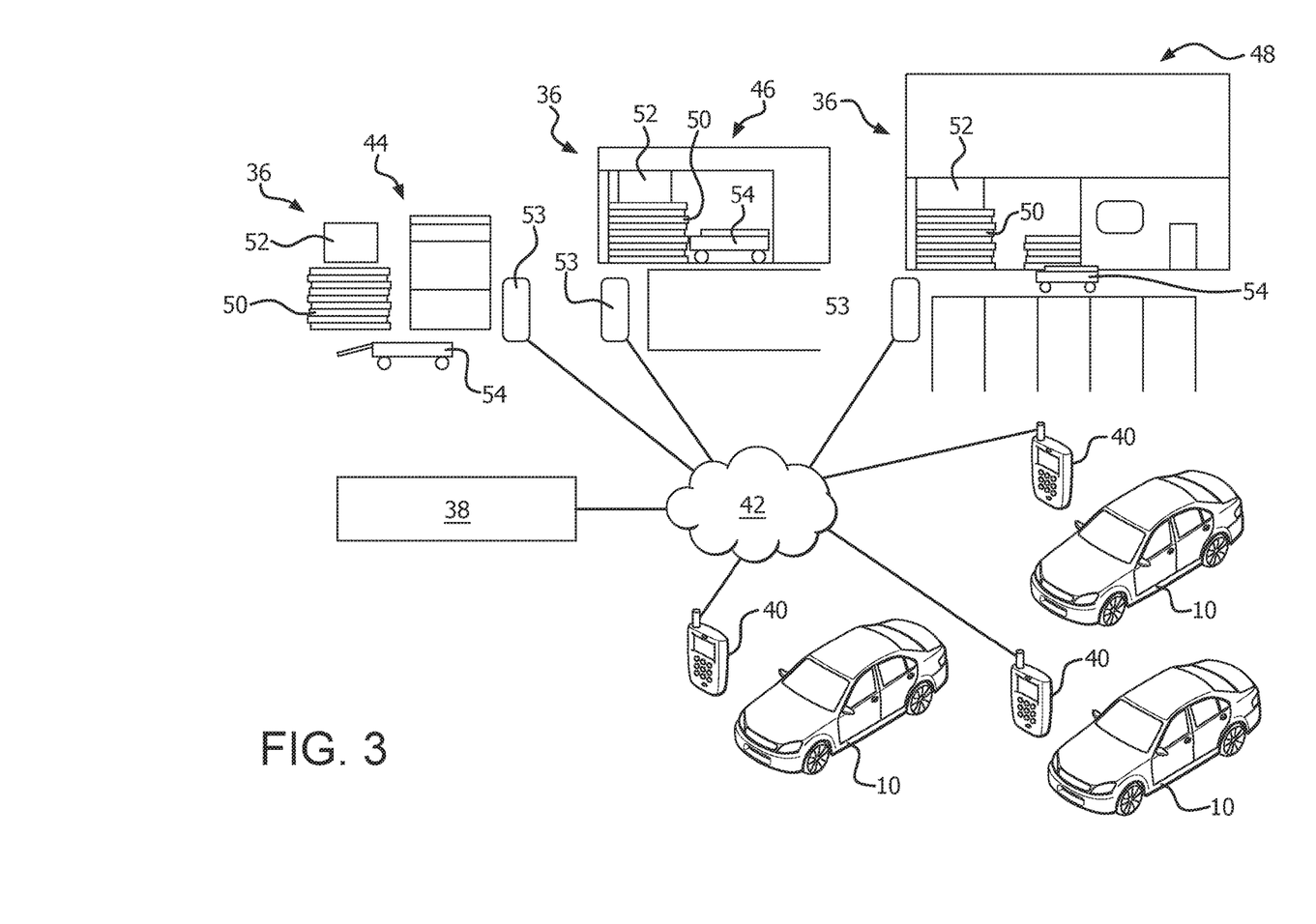
FIG. 3 is a schematic illustration of an exemplary battery replacement system.

FIG. 3 illustrates an exemplary replacement battery system 30 which includes a management system 32 and a customer system 34. The replacement battery system 30 is an infrastructure which provides options to a user of vehicle 10 for replacing a discharged battery pack 20 with a charged battery pack 20. The management system 32 includes a plurality of battery replacement stations 36 which serve as service locations for a battery replacement operation. Management system 32 also includes a control system 38 for coordinating with the customer system 34. The customer system 34 includes a plurality of vehicles 10. The customer system 34 further includes a plurality of client devices 40.

Each client device 40 is a communication terminal which may be used to communicate with control system 38. For example, each client device 40 may be a different user's mobile device (e.g., smart phone, laptop, etc.) or home computer. In other embodiments, the client device 40 may be a computing device on the vehicle 10, such as an on-board computer. The client device 40 may be configured to coordinate a battery replacement operation through a mobile application, website, etc. The client devices 40 and the control system 38 may be connected by a network 42.

The network 42 may include one or more of a cellular network, the Internet, WiFi, etc.

In an exemplary embodiment, each client device 40 may communicate with the control system 38 to coordinate a battery replacement service for a vehicle 10 at a battery replacement station 36. The control system 38 and the client devices 40 preferably include computing components (e.g., processors, memory, databases, and I/O devices) which allow a user to operate the client device 40 such that the client device 40 coordinates a battery replacement operation and provides the details of the battery replacement operation to the user. The control system 38 is configured to communicate with each battery replacement station 36 to coordinate the battery replacement operation with a selected station.

As shown in FIG. 3, the plurality of battery replacement stations 36 may include a first station 44, a second station 46, and a third station 48. These stations 44, 46, 48 may correspond to a different type of battery replacement stations 36. The different types of battery replacement stations 44, 46, 48 may provide different types of battery replacement services.

For example, the first station 44 may be a manual-service station in which a replacement battery pack 20 is delivered to a vehicle 10. For example, a service provider may deliver a charged battery pack 20 to a vehicle, replace the vehicles discharged battery pack 20 with the charged battery pack, and haul away the discharged battery pack 20. The first station 44 is thus located wherever the vehicle 10 is located when a battery replacement operation is requested (or other agreed-upon location).

The second station 46 may be a designated battery replacement location, such as a particular parking location on a street or in a parking lot. A vehicle 10 may stop in the parking location, wait for a service provider to perform a battery replacement operation, and drive away. The service provider may be a robotic cart which automatically performs the battery replacement operation.

The third station 48 may be an automated battery replacement center, such as a dedicated service center which provides battery replacement services. The third station 48 may be similar to the second station 44 in that a robotic cart may perform the battery replacement service. For example, the robotic cart may select a charged battery pack 20 from a queue, deliver it to the vehicle 10, perform the operation, and return the discharged battery pack 20 to the queue for being recharged and stored for a future battery replacement operation.

The disclosed battery replacement stations 36 and associated operations provide a variety of options for replacing a battery pack 20 of a vehicle 10. The different options may be applicable to different environments. For example, the first station 44 may be suitable for densely-populated areas (e.g., cities) while the second station 46 may be more suitable outside of a city where designated parking spots may be available. The third station 48 may be suitable for suburban and rural areas where space for a dedicated service center is available.

It should be understood that the above-described battery replacement stations 36 are exemplary and that other types of stations and services may be provided. Moreover, the location of any particular type of battery replacement station 36 is not limited. For example, a third station 48 may be located in a city and a first station 44 may be located in a rural area. The above description is merely intended to explain how a variety of different battery replacement options may be provided to adapt to the differing environments in which battery replacement operations may be needed. In this way, the use of the vehicle 10 is not limited to particular areas.

As shown in FIG. 3, each battery replacement station 36 may include a battery pack queue 50, a charging device 52, a coordinating device 53, and a service provider 54. The battery pack queue 50 includes a plurality of battery packs 20 awaiting placement into a vehicle 10. The charging device 52 recharges depleted battery packs 20 which are received from vehicles 10. The coordinating device 53 is a computing device (e.g., including a processor, memory, database, and/or I/O device) in communication with the control system 38. The service provider 54 may be an operator or an automated device (e.g., robotic cart) which is capable of performing a battery replacement operation.

In an exemplary embodiment, the battery packs 20 in the battery pack queue 50 are standardized such that they may be provided to any vehicle 10. In other embodiments, the battery packs 20 may be organized based on vehicle 10 or types of vehicles 10 that can receive the battery pack 20 (e.g., based on make, model, etc.).

In addition, the battery packs 20 may be modular and sized such that more than one battery pack 20 is configured to be attached to a vehicle 10 at a time. This provides additional customization and practicality to the replacement battery system 30 because a user can select a certain number of battery packs 20 to be added or subtracted during a battery replacement operation. For example, a user planning to drive a short distance may request only one or two battery packs 20 and a user planning to drive a longer distance may request three or four battery packs 20. This configuration also allows a servicing company to offer a subscription-type product to consumers, in which a selected number of battery packs 20 are allotted per payment period, for example.

The battery packs 20 in the battery pack queue 50 are preferably stored in a manner that is efficient and helps to maintain a long useful life for each battery pack 20. One manner in which this can be achieved is by storing the battery packs at less than a full charge. For example, the battery packs 20 may be stored at 50-90% of full charge. In a preferred embodiment, the battery packs 20 are stored at 70% of full charge. Storing a battery at full charge for an extended period of time negatively effects the useful life of the battery and may reduce an amount equal to full charge. By storing the battery packs 20 at less than full charge, the useful life of the electrical storage devices 18 (and thus the battery packs 20) is extended. A battery pack 20 may be charged to full charge (e.g., 90% charge or greater) prior to being placed into a vehicle 10 (e.g., based on an instruction from the coordinating device 53).

In some embodiments, the coordinating device 53 may be configured to prepare a battery pack 20 in anticipation of it being installed in a vehicle 10. For example, the coordinating device 53 may determine that a battery replacement operation is upcoming and fully charge a battery pack 20 in the battery pack queue 50. The coordinating device 53 may receive information and predict that a battery pack 20 will be required. For example, the coordinating device 53 may predict the possibility of a user requesting a battery replacement operation based on information such as the date and time, historic use patterns, an amount of charge remaining on a battery pack 20 that is in use, vehicle location or intended destination (e.g., based on user calendar or navigation system information).

The coordinating device 53 may be configured to alert a user via a message to a client device 40. The message may indicate information such as a need for a replacement battery pack 20, a status of a replacement battery pack 20, etc. The coordinating device 53 may further be configured to schedule a battery pack charging operation at a future time.

Figure 4:
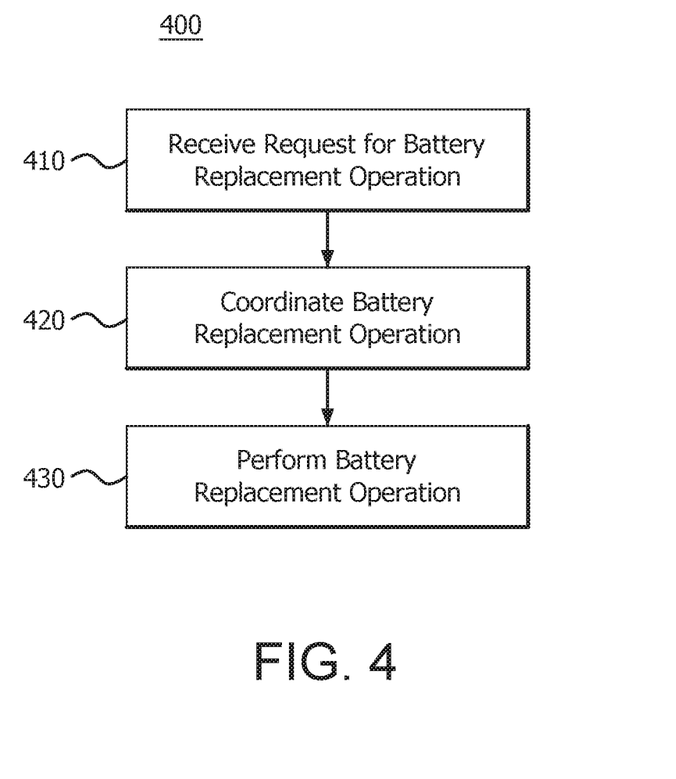
FIG. 4 is a flowchart of an exemplary battery replacement process.

FIG. 4 illustrates an exemplary battery replacement process 400. Process 400 may be performed by one or more components of the management system 32 and/or the customer system 34. For example, one or more steps of the process 400 may be performed by a processor associated with control system 38, a service provider associated with a battery replacement station 36, and/or a processor associated with a client device 40.

Prior to the battery replacement process 400, it may be determined that a vehicle 10 is in need of a battery replacement operation. This may be determined by a user (e.g., a driver of the vehicle 10), the client device 40, the control system 38, and/or a coordinating device 53. For example, the vehicle 10 may provide data (e.g., to the user and/or the client device 40) which indicates that a battery replacement operation is needed (e.g., based on an amount of charge remaining and/or an amount of charge needed to reach an intended destination).

In step 410, the control system 38 receives a request for a battery replacement operation. The control system 38 may receive the request at a processor from the client device 40 via the network 42. Client device 40 may send the request based on a determination that an associated vehicle 10 requires a battery replacement and/or based on user input to the client device 40. The request may include status information. The status information may include, for example, a location of the vehicle, a remaining battery charge, historical replacement information, battery availability information, or future travel information. In some embodiments, the control system 38 may receive status information from another source. For example, the control system 38 may receive status information from a coordinating device 53 (e.g., battery availability information, predictive battery replacement information, etc.). For example, in one embodiment, the request includes a location of the client device 40 and/or the vehicle 10. In another exemplary embodiment, the request includes a desired location for the battery replacement operation to take place.

In step 420, the control system 38 coordinates the battery replacement operation. In one example, the control system 38 selects, by a processor, a battery replacement station 36 where the battery replacement operation is to take place. The control system 38 may communicate with coordinating devices 53 to determine the battery replacement station 36.

In some embodiments, the control system 38 determines the battery replacement station 36 based on the received status information. In one embodiment, the status information includes the location of the vehicle 10 (which may be assumed to be the location of the client device 40 if not provided with the request). For example, the control system 38 may identify a battery replacement station 36 closest to the vehicle 10 or otherwise based on proximity. In other embodiments, the control system 38 may determine the battery replacement station 36 based on other status information, such as a station that is selected in the request, an availability of charged battery packs 20 at various stations, a type of vehicle 20 (e.g., make, model, etc.), the date, time of day, or a desired time for the battery replacement operation, a travel plan, an associated subscription plan, etc. The selected battery replacement station 36 may be any of the stations 44, 46, 48 described herein, or may be another type of station.

After the control system 38 selects a battery replacement station 36, the control system 38 sends a message to the client device 40. The message indicates when and where the battery replacement operation will take place. For example, the message may include the selected battery replacement station 36. The selected battery replacement station 36 may be a station location or a designated parking location. The client device 40 may display this information to a user.

In some embodiments, coordination of the battery replacement operation may include charging a battery pack 20 to full charge. As described above, the battery packs 20 in the battery pack queue 50 may be stored at less than full charge. During step 420, the control system 38 and/or coordinating device 53 may provide an instruction to charge a selected battery pack 20 to full charge such that the battery pack is ready to be installed in a vehicle 10. For example, the coordinating device 53 may receive a request from the control system 38 (or the client device 40), select a charged battery 20 to be used in the battery replacement operation, and charge the selected battery to full charge. In other embodiments, the control system 38 and/or coordinating device 53 may predict a timing of a battery replacement operation and initiate a process to prepare a battery pack 20 by charging it to full charge (e.g., 90% or greater).

As a result of steps 410 and 420, a battery replacement operation is coordinated between a vehicle 10 and a battery replacement station 36. This information may be provided to the user by the client device 40. In some instances, the driver then drives the vehicle 10 to the appropriate location at the appropriate time. In other instances, the vehicle's current location may be the battery replacement station 36 (e.g., as a first station 44) and the user and vehicle 10 wait until a service provider arrives. In some embodiments, the process 400 may be completed when the battery replacement operation is coordinated. In other embodiments, the process 400 further includes the step described below.

In step 430, the battery replacement operation is performed. The control system 38, coordinating device 53, and/or service provider 54 may perform step 430. Step 430 may include, for example, a battery pack 20 being selected from the battery pack queue 50, the battery pack 20 being delivered to the vehicle 10, the depleted battery pack 20 being removed from the vehicle 10, and the charged battery pack 20 being connected to the vehicle 10. Step 430 may also include the depleted battery pack 20 being returned to the battery pack queue 50 and recharged by the charging device 52. All or some of step 430 may be automated, such as in embodiments in which the service provider 54 is a robotic cart.

Step 430 may depend on the type of battery replacement station 36 at which the battery replacement operation is being performed. For example, at a first station 44, the battery replacement operation may include delivering the charged battery 20 to the location of the vehicle at the time the request was received. In a second 46, 48, the battery replacement operation may include the vehicle and service provider 54 meeting at a selected location (e.g., a designated parking location or spot).

The battery replacement operation preferably includes attachment mechanism 24 being disconnected in relation to the depleted battery pack 20 and reattached in relation to the charged battery pack 20. The operation may also include the disconnection and connection of more than one battery packs, such as the embodiment of vehicle 10 depicted in FIG. 2. After the battery replacement operation is complete, the vehicle 10 drives away.

The disclosed embodiments provide a battery replacement system and associated methods which are configured to support a plurality of battery replacement-model vehicles on the roads. The disclosed system provides options for a user to replace a depleted battery pack on the vehicle, thereby allowing the vehicle to continue traveling without substantial interruption. The availability of different types of battery replacement stations allows the system to be adaptable to different environments and renders implementation more practical. Moreover, the integration of a battery replacement process through a user's client device allows for simple and efficient coordination of a battery replacement operation when needed.

The disclosed embodiments further allow a driver to operate a battery replacement-model vehicle without limit to location and range of travel. Moreover, the disclosed features allow for customization of the battery replacement system and the manner in which replacement battery packs are made available to customers. For example, a subscription service may be provided where a customer pays for a selected number of battery packs in advance. In embodiments in which multiple battery packs are used for a single vehicle (e.g., FIG. 2), the available services may be further customizable to allow a driver to select a number of battery packs to be connected to the vehicle at any given time.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A management system of a vehicle battery replacement system, comprising:
    a plurality of battery replacement stations for replacing a depleted battery pack of an electric vehicle with a charged battery pack, wherein each battery replacement station includes a coordinating device, wherein the plurality of battery replacement stations includes a first station and a second station, and wherein the first station is a different type than the second station; and
    a control system in communication with the coordinating devices of the battery replacement stations and a plurality of client devices, wherein the control system is configured to:
        receive a request for a battery replacement operation from a client device; and
        select a battery replacement station of the plurality of battery replacement stations for performing the battery replacement operation.

2. The management system of claim 1, wherein the request for the battery replacement operation includes a location, and the control system selects the battery replacement station based on the location.

3. The management system of claim 2, wherein the location is a location of the vehicle.

4. The management system of claim 1, wherein the first station or the second station is configured to deliver the charged battery pack to a location of the vehicle at the time the request was sent.

5. The management system of claim 1, wherein the first station or the second station includes a designated parking location for conducting the battery replacement operation.

6. The management system of claim 1, wherein the battery replacement station further includes a battery pack queue comprising charged batteries.

7. The management system of claim 6, wherein the charged batteries are stored at less than full charge, and
    wherein a coordinating device is configured to provide an instruction to charge a selected battery pack to full charge based on the request for a battery replacement operation.

8. The management system of claim 1, wherein the battery replacement station further includes a service provider configured to perform the battery replacement operation, wherein the service provider is a robotic cart.

9. The management system of claim 1, wherein the client device is a mobile device.

10. The management system of claim 1, wherein the client device is an on-board computer of the vehicle.

11. A battery replacement station, comprising:
    a battery pack queue comprising partially-charged batteries stored at less than full charge;
    a charging device; and
    a coordinating device configured to:
        receive, from a client device associated with a vehicle, a request to perform a battery replacement operation for the vehicle, wherein the request includes information about a type of the vehicle;
        select, based on the request, a partially-charged battery from the battery pack queue to be used in the battery replacement operation for the vehicle, wherein the selected partially-charged battery is compatible with the type of the vehicle; and
        charge, via the charging device and in response to receiving the request from the client device, the selected partially-charged battery to full charge for installation in the vehicle.

12. The battery replacement station of claim 11, wherein the partially-charged batteries are stored at approximately 70% of full charge.

13. The battery replacement station of claim 11, wherein the coordinating device is further configured to:
    schedule the battery replacement operation for the vehicle at a future time, and wherein the selected partially-charged battery is charged to full charge for installation in the vehicle prior to the future time.

14. A method for replacing a battery pack of an electric vehicle, comprising:
    receiving a request for a battery replacement operation from a client device, the request including status information; and
    coordinating, by a processor, the battery replacement operation by selecting a battery replacement station from a plurality of battery replacement stations for performing the battery replacement operation based on the status information, wherein the plurality of battery replacement stations includes a first station and a second station, and wherein the first station is a different type than the second station, and
    wherein the status information includes one or more of a location of the vehicle, a desired battery replacement station, a remaining battery charge, historical replacement information, battery availability information, or future travel information.

15. The method of claim 14, further comprising sending a message to the client device, the message identifying the selected battery replacement station.

16. The method of claim 15, wherein the message identifies a designated parking spot for performing the battery replacement operation.

17. The method of claim 14, wherein the status information is a vehicle location and the battery replacement station is selected based on a proximity to the location.

18. The method of claim 14, further including performing the battery replacement operation, including removing a depleted battery pack from the vehicle and connecting a charged battery pack to the vehicle.

19. The method of claim 18, wherein performing the battery replacement operation includes delivering the charged battery pack to a location of the vehicle at the time the request was received.

20. The method of claim 18, wherein the battery replacement operation is performed by a robotic cart.

* * * * *